US005781291A

United States Patent [19]

So et al.

[11] Patent Number: 5,781,291

[45] Date of Patent: Jul. 14, 1998

[54] SMOKE DETECTORS UTILIZING A HYDROPHILIC SUBSTANCE

[75] Inventors: Bernard Y.C. So, Wheaton; George A. Shoenfelder, Batavia, both of Ill.; Juliette C. Daly, Pleasonton, Calif.

[73] Assignee: Pittway Corporation, Chicago, Ill.

[21] Appl. No.: 734,897

[22] Filed: Oct. 22, 1996

[51] Int. Cl.[6] .......... G01N 21/00; G08B 17/10

[52] U.S. Cl. .......... 356/338; 356/340; 340/628; 340/630

[58] Field of Search .......... 356/335–343; 340/627–634

*Primary Examiner*—Frank G. Font

*Assistant Examiner*—Jason D. Vierra-Eisenberg

*Attorney, Agent, or Firm*—Dressler, Rockey, Milnamow & Katz, Ltd.

[57] ABSTRACT

A smoke detector incorporates a porous plastic material which carries a hydrophilic agent alone or in combination with a surfactant which can be sprayed or deposited onto structural elements of the detector. The detector can include a molded removable plastic element that carries a hydrophilic agent. The element can be arranged to surround a light beam injected into a sensing region of a photoelectric detector.

24 Claims, 2 Drawing Sheets

SMOKE DETECTORS UTILIZING A HYDROPHILIC SUBSTANCE

FIELD OF THE INVENTION

The invention pertains to ambient condition detectors. More particularly, the invention pertains to such detectors which exhibit improved performance characteristics in the presence of condensation.

BACKGROUND OF THE INVENTION

Smoke detectors have been recognized as useful and important devices in providing early warnings in the presence of smoke or fire. Such detectors sense the presence of particulate matter, such as smoke particles, in the ambient atmosphere. The presence of such particulate matter provides an indication of the presence of a fire condition.

Various types of detectors are known. Scattering-type photoelectric and ionization-type detectors sense airborne byproducts of combustion using different technologies. Obscuration detectors which have a different structure are also known.

Irrespective of the type of technology, reliable performance in the presence of varying ambient conditions is desired. Typical ambient parameters include vibration and temperature variations to which the detectors will be subjected. Once installed, most detectors tend to be subjected to very limited amounts of vibration which can be tolerated by the circuitry.

Known detectors generally tend to perform satisfactorily in temperature ranges which are comfortable for individuals working in the areas being monitored. There are instances where condensation can form on the surfaces of a detector, especially where the detector is installed adjacent to a cold wall or conduit.

SUMMARY OF THE INVENTION

Smoke detectors in accordance with the present invention, provide improved performance in the presence of condensation. In such detectors, in one aspect, wetting or water absorbing agents are applied to or incorporated into those detector elements which tend to increase light scattering in the presence of condensation. This in turn counteracts the formation of scattering causing water droplets and also counteracts the generation of false alarms.

In one aspect of the invention, a hydrophilic agent or substance is incorporated into a porous plastic prior to molding one or more of the elements of a detector. Subsequently, when the various parts of the detector are formed of the subject porous plastic material, the hydrophilic substance therein attracts and absorbs humidity or moisture within the internal sensing region of the detector thereby reducing the effects of humidity or condensation therein.

In another aspect of the invention, the housing for a detector can be molded of the subject porous plastic. Alternately, in the case of a photoelectric detector, portions of the housing such as an aperture through which a beam of radiant energy or light is injected into the sensing region, the septum of the detector or the screen which surrounds the housing all can be formed of a porous plastic which incorporates a hydrophilic, absorbing, substance.

In yet another aspect of the invention, a surfactant can be applied to various surfaces within the housing of a detector so as to reduce the surface tension of water droplets thereon to minimize undesired refractions and/or reflections.

Alternately, surfactants can be incorporated into the plastic materials used to mold the housings for the detectors so as to reduce the formation of droplets on the interior surfaces of the detector housings to minimize reflections. Surfactants can be coated, sprayed or deposited in any other fashion on other surfaces of interest such as a photo sensor in a photoelectric smoke detector.

In yet another aspect of the invention, hydrophilic materials can be incorporated into detectors by forming same into a replaceable insert, such as a ring, or a screen.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
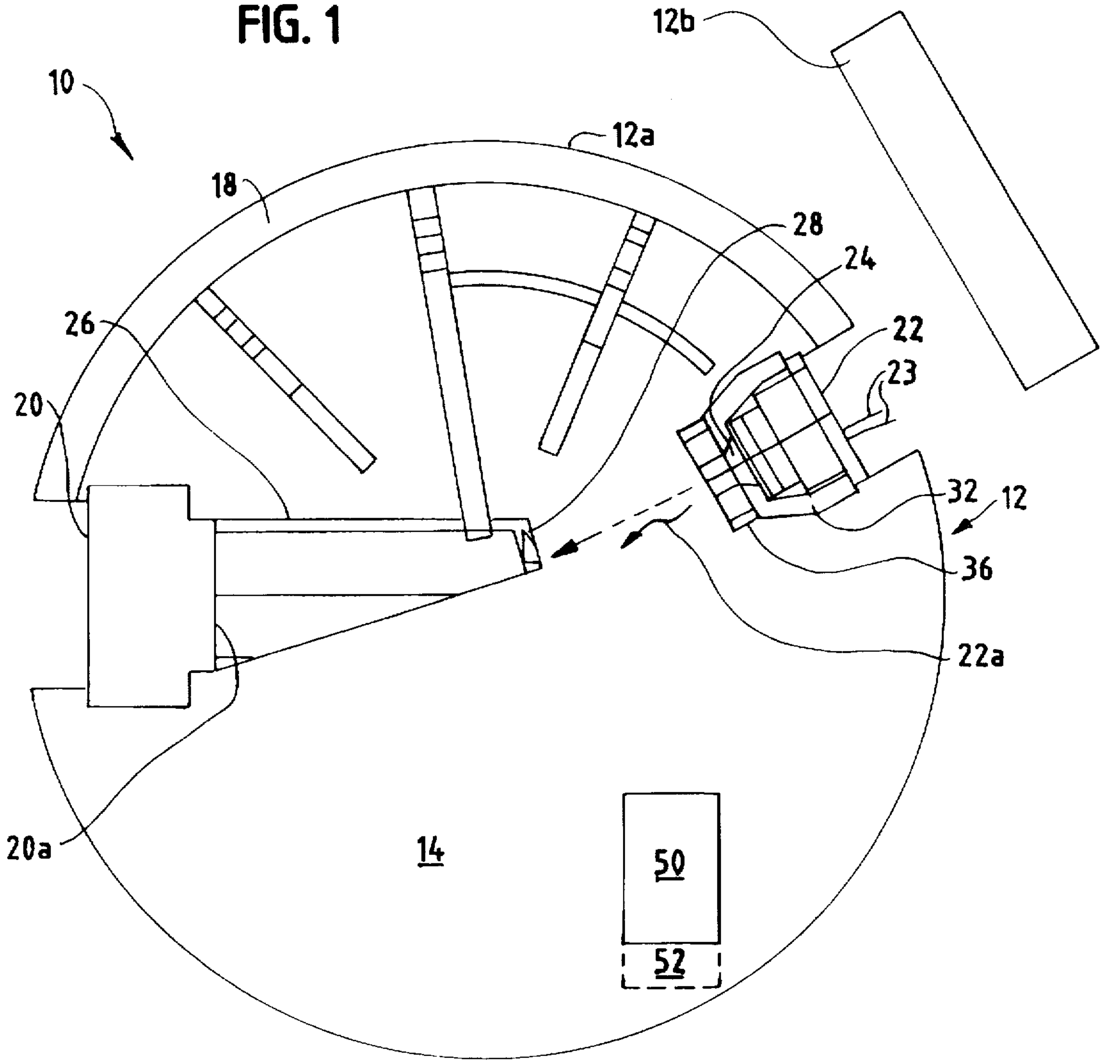
FIG. 1 is an enlarged top plan view of a detector in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

A smoke detector 10 in accordance with the present invention is illustrated in a top plan view in FIG. 1. The detector 10 includes a molded plastic housing 12. The housing 12 includes a base **12*a* and a cover 12*b*. The housing 12 could be formed as a generally cylindrically-shaped structure which defines an internal sensing region 14**.

The side wall of the cover **12*b*, as would be known to those of skill in the art, is open for the purposes of enabling exterior ambient air, which might also be carrying products of combustion such as particulate matter indicative of smoke or fire, to enter the sensing region 14. As also would be known to those of skill in the art, the cover 12*b* is intended to block exterior incident radiant energy or light from entering the interior sensing region 14**.

Surrounding the outer periphery of the region 14 is a screen 18 for the purpose of keeping out insects and larger airborne contaminant materials such as fibers or the like. Carried within the region 14 is a photo sensor or photo receptor 20. The photo receptor, as would be known to those of skill in the art, is intended to produce electrical signals indicative of light scattered in the chamber 14 due to airborne particulate matter which is indicative of combustion or fire.

Spaced from the photodetector 20, carried on the base **12*a* is a source of radiant energy or light 22. The source 22 could be for example a laser diode or any other source of radiant energy which, for example, could be pulsed to produce a beam of light 22*a* which is directed across the region 14. The output beam 22*a* can be focused by a lens 24**.

As noted above, light from the beam 22*a*, which is scattered by ambient particulate matter, is intended to, at least in part, fall on photo receptor 20. To limit the light incident upon the photo receptor 20, and to improve the signal to noise ratio, a somewhat cylindrical collector structure 26 is carried adjacent to an input port 20*a* of the photo sensor 20. The collector 26, as would be known to those of skill in the art, reflects and directs scattered light onto the receptor 20 thereby improving the signal to noise characteristics of the detector 10.

The collector 26 carries a septum 28 at an end thereof. The septum 28 is intended to block any incident light from the source 22 which might fall directly on the detector 20.

The source 22 is carried in a mounting element 32 which is in turn carried on the base 12*a*. The mounting element 32 slidably receives the source 22 and supports and aligns the source mechanically relative to the septum 28 and the collector 26. The beam 22*a* exits the element 32 via an output port 32*a* (best seen in FIG. 3).

The element 32 defines a radiant energy output aperture 32*a* (best seen in FIG. 3) through which the light beam 22*a* travels into the region 14. To improve performance of the detector 10 in the presence of condensation, a hydrophilic porous plastic plug 36 is positioned adjacent to the output port 32*a* of the support housing 32 near the lens 24.

Figure 2A:
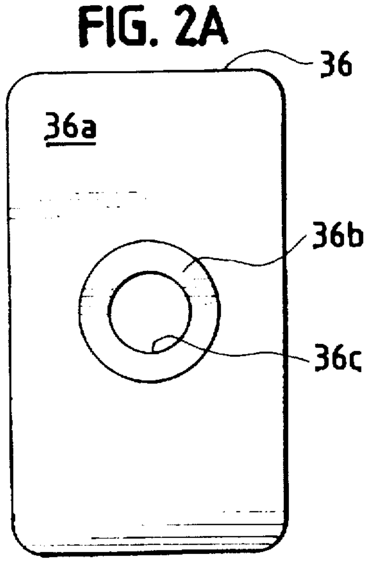
FIG. 2A is an enlarged front elevational view of a removable, porous plastic hydrophilic element in accordance with the present invention.
Figure 2B:
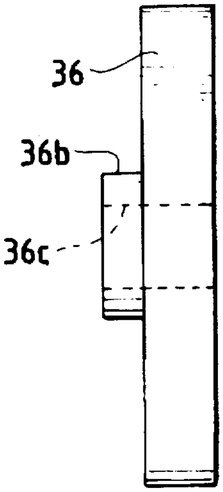
FIG. 2B is a side elevational view of the element of FIG. 2A.
Figure 3:
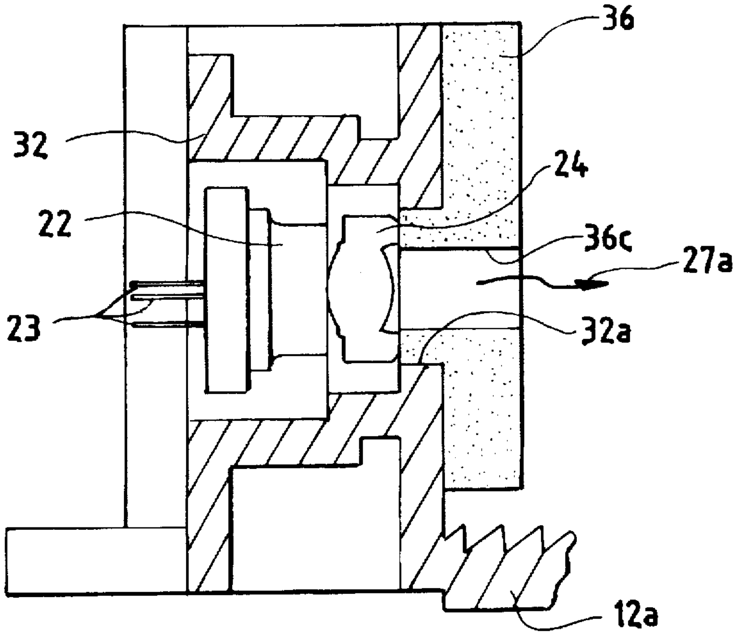
FIG. 3 is an enlarged view, partly in section, of a support element for a light source.

As illustrated in FIGS. 2A and 2B, the plug 36 has a generally rectangular shaped body portion 36*a* which carries an annular extension 36*b*. A cylindrical opening 36*c* extends through the plug 36. As best illustrated in FIG. 3, the plug 36 slidably engages the radiant energy output aperture 32*a* and surrounds the beam 22*a* as that beam is entering the region 14.

The plug 36 can be molded of porous plastic which incorporates a hydrophilic agent or substance. The absorbent characteristics of the plug 36 contribute to the minimization of water droplets on the lens 24.

The collector 26 and/or septum 28 could also be molded of a similar porous plastic which incorporates a hydrophilic agent or substance. Finally, the housing, including base 12*a* and cover 12*b* as well as screen 18 could all be formed of a similar porous plastic which incorporates a hydrophilic agent or substance.

It will be understood that while the detector 10, as illustrated, is a scattering-type photoelectric unit, the principals of the present invention can be incorporated into ionization-type smoke detectors which are formed either alone or in combination with photoelectric detectors.

As noted above, the lens 24 can be located for example either in or adjacent to the aperture 36*c* for purposes of further focusing the beam 22*a*. Such a lens could be molded of a transparent plastic which also incorporates a hydrophilic agent or substance.

A lens could also be provided adjacent to the detector 20 or could be formed integral with the detector 20. Such lenses could be combined with hydrophobic agents.

Alternately, a surfactant could be incorporated into, sprayed on or deposited in any other fashion on various surfaces of the detector 10. Such surfactants would reduce the surface tension of droplets of moisture which condense on the respective surfaces. The lens 24 of the source 22 as well as the lens of the receptor 20 could each be coated with a surfactant. Additionally, both collector 26 and/or septum 28 could be coated with a surfactant or formed with a surfactant carrying plastic. Similarly, the base and cover 12*a*, 12*b* along with the screen 18 could also be coated with a surfactant or formed of surfactant carrying plastic. In this instance, there would be no need to use a porous plastic.

Finally, it will be understood that both hydrophilic agents and surfactants can be used in combination without departing from the spirit and scope of the present invention.

The detector 10 can also incorporate a condensation sensor 50 carried on the base 12*a*. The sensor 50 could incorporate a porous plastic material which incorporates a hydrophilic substance or agent for the purpose of providing an indication of the level of moisture or condensation in the detector 10. The concentration of moisture or condensation can be detected by sensing a change of resistance of the sensor 50 in accordance therewith.

The sensor 50 can be coupled to local control circuitry 52, illustrated in phantom in FIG. 1. The source 22 can be intermittently energized, via conductors 23 (best seen in FIG. 3), by the local control circuitry 52.

The detector 10 can communicate, via circuitry 52 with a remote or displaced control unit for an alarm system. In this aspect, a plurality of detectors, such as the detector 10, can be coupled to and in communication with the control unit.

Various methods, as described subsequently, can be used alone or in combination to improve detector performance in the presence of condensation and/or humidity. The method or methods selected are dependent on detector design.

Method A

A hydrophilic porous plastic element can be installed on or adjacent to those smoke detector components that increase unwanted scattering of light in the presence of condensation and/or moisture to at least absorb the condensate on its surface and surface adjacent to it. The absorptive effect results from the inter-connecting hydrophilic pores of the porous plastic. An example of a porous plastic element is the plug 36 as shown in FIG. 1 and 2. The advantages of a hydrophilic porous plastic (absorptive) element include:

1. it can be mounted so as to surround a lens without obstructing an adjacent light source and kept the lens clear of water droplets in the presence of condensation and/or humidity;
2. the porous plastic can carry a reservoir of wetting or other absorptive agents to ensure its long lasting absorption power; and
3. hydrophilic porous plastic (unlike hygroscopic agents) doesn't expand and contract as it absorbs and gives up moisture.

The porous plastic element can be molded by sintering plastic powders. The plastic powders include polyethylene, polypropylene, polysulfone, ethylene vinyl acetate, polystyrene, elastomer, nylon, polyethersulfone, polyphthalate carbonate, and plastics available under the trademark KYNAR.

The preferred plastic powders include polyethylene and polypropylene. The most preferred plastic powder is polyethylene.

The average powder particle size is less than 500 microns. The preferred particle size is less than 125 microns. The most preferred particle size is less than 44 microns.

Wetting agents can be used to make the porous plastic hydrophilic and absorptive. The wetting agents incorporate a surface-active molecule that is partly hydrophilic (water-soluble) and partly lipophilic (soluble in lipids, or oils).

The lipophilic part of the molecule includes fatty acid or a rather long chain carbon group, such as fatty alcohols or alkybenzene. The hydrophilic part of the molecule includes —COONa, or a sulfo group, such as $—OSO_3Na$ or $—SO_3NA$ (such as in fatty alcohol sulfate or alkybenzene sulfonate), or a long ethylene oxide chain. The wetting agents can be anionic, cationic, nonionic and ampholytic or amphoteric. There are at least three different methods that can be used to apply a selected surface wetting agent to the porous plastic:

Method 1: The wetting agent can be applied topically to the porous plastic subsequent to molding. Typical wetting agents include quaternary ammonium compounds, which include those available under the trademarks ATMER (1004, 1005 and 1006), CYASTAT (609, SN, and SP), and LAROSTAT (2645A, 88, 96, 451, and 477). Other compounds include amines such as NON-RUST NEUTRO-stat; and anionics available under the trademarks DEHYDAT (93P, and 80X), LAROSTAT (60A and 3001), and RHODAFAC (RE-610, RS-410, RS-610, RS-710, and PE-9).

The wetting agents are usually in the form of aqueous or alcohol solutions in a concentration of less than 10%, preferably less than 5%, and most preferably less than 2.5%. The advantage of post molding application is that the wetting agent doesn't have to be exposed to the process conditions.

Method 2: A selected wetting agent can be mixed with the plastic powder before sintering. Therefore, the wetting agent needs to tolerate the sintering temperature. For ultra high molecular weight polyethylene the sintering temperature should be less than 280° F., preferably in the range of 200–275° F., and most preferably in the range of 250°–270° F. Typical wetting agents include and are available under the trademarks GEROPON T-33, and ALKAMULS GMS/C.

The wetting agent concentration depends on the porous plastic system and is usually less than 10%. The advantages of this include the presence of a reservoir of wetting agent held in the porous plastic to ensure long lasting hydrophilic absorptive effect. In addition, the wetting agent is incorporated into the plastic powder and doesn't require migration through the plastic matrix to reach the surface of the plastic.

Method 3: The wetting agent is incorporated internally in the plastic matrix of the plastic powder. Therefore, the wetting agent has to be able to tolerate the plastic processing temperature, the grinding environment, and the sintering temperature. Moreover, the wetting agent has to have a degree of compatibility with the plastic to provide the mechanical integrity and the controlled incompatibility to migrate to the plastic surface. The proper wetting agent is strongly affected by the plastic system. For polyethylene and polypropylene representative agents include:

a. amines such as ARMOSTAT (310, 410 and 1800), CHEMSTAT (122, 112/60DC, 182, 182/75, 192, and 192/NCP), COLORTECH (10310-12, 10410-12, 1063-12, and 10509-13), and KEMAMINE (AS650, AS974, AS974/1, AS989 and AS990).

b. glycerol esters such as ATMER ((122, 122K), (125, 125K), and (129, 129K, 129V)), MYVEROL (18-04K, 18-06K, 18-07K, 18-92K, and 18-99K), and PATIONIC (900, 901, 902, 907, 909, 1042, 1042K, 102, 1052K, 1064, and 1083); and c. anionics such as DEHYDAT (93p and 80X), and RHODATAC (RE-610, RS-410, RS-610, RS-710, and PE-9).

The required wetting-agent concentration depends on the additive and plastic system, but is usually less than 3%, and is less than 1% for most cases. The advantages include better dispersion and longer hydrophilic life.

Additional additives such as conductive carbon black can be added to make the porous plastic conductive and optically black. Solid adhesive such as ethylene vinyl acetate and NEWARK 32 can also be added to improve the mechanical integrity of the porus plastic pieces. Germicidal additives such as N-(Trichloromethylthio) phthalimide, 2-n-octyl-4-isothiazolin-3-one, N-trichloromethylthio-4-cyclohexene-1, 2-dicarboximide, and 10, 10-oxybisphenoxarsine can be used to eliminate microbial such as mildew.

Method B:

Wetting agents can be applied to the smoke detector components that increase the back scattering light during condensation plunge by spreading the water deposit to prevent the formation of water droplets. There are two methods to apply the wetting agent to the plastic as shown in Method A, which are topical application, and incorporating internally to the plastic matrix. The advantages of the direct application of the wetting agent to the smoke chamber include no requirement to have an insert, and direct application makes possible complicated smoke chamber design.

Method C:

Water absorptive surfaces can be created on the smoke detector components that increase the undesired scattering of light in the presence of condensation and/or moisture to absorb the condensate on its surface. The water absorptive surfaces can be created by applying hygroscopic substances on the surface of interest. The hygroscopic substances include glycerin, polyols and polyglycols. The advantages of this approach are that no insert is required, and any plastic compatibility problem is reduced.

The preferred methods use the hydrophilic porous plastic element (Method A) or hydrophilic smoke chamber (Method B). The most preferred method is to incorporate a hydrophilic porous plastic element to protect the lens into a hydrophilic smoke chamber (combination of methods A and B).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An ambient condition detector comprising:

a housing which defines a sensing region;

a source for projecting a beam of radiant energy into the region;

a sensor carried by said housing for converting scattered radiant energy incident thereon to a corresponding electrical signal wherein the housing carries an element which is selected from a class which includes a surfactant containing plastic, a surfactant coated plastic, and a porous plastic which incorporates a hydrophilic substance.

2. A detector as in claim 1 which includes a surfactant containing plastic element carried by said housing adjacent to the projected beam.

3. A detector as in claim 1 wherein the beam passes through an aperture and wherein the aperture is defined in a surfactant coated material.

4. A detector as in claim 1 wherein the beam passes through an aperture and wherein the aperture is defined in a porous plastic element which incorporates a hydrophilic substance.

5. A detector as in claim 1 wherein the housing is formed, at least in part, of a surfactant coated plastic.

6. A detector as in claim 1 wherein the beam passes through a lens and wherein the lens is formed, at least in part, of a surfactant containing material.

7. A detector as in claim 1 wherein the beam passes through a lens and wherein the lens is formed at least in part, of a surfactant coated material.

8. A detector as in claim 1 which includes a molded plastic septum coated with a surfactant.

9. A detector as in claim 1 which includes a septum molded of a porous plastic which incorporates a hydrophilic-type substance.

10. A detector as in claim 1 which includes a removable element that incorporates a hydrophilic material.

11. A detector as in claim 10 wherein the removable element is smoke transmissive.

12. A detector as in claim 11 wherein the removable element includes a cylindrical screen.

13. A detector as in claim 10 wherein the removable element includes at least a portion of the housing.

14. A smoke detector comprising:

a housing which defines an internal region;

a smoke sensor carried at least in part within the housing wherein the housing carries a hydrophilic substance.

15. A detector comprising:

a housing which defines an internal region;

an ambient condition sensor carried at least in part within the housing wherein the housing carries a hydrophilic substance.

16. A detector as in claim 15 wherein the sensor includes:

a light source and a photosensor for sensing light incident thereon.

17. A detector as in claim 16 which includes a lens located adjacent to the source wherein the lens is coated with a surfactant.

18. A detector as in claim 16 wherein the source projects a light beam into the region and wherein the housing carries an aperture through which the beam is projected and wherein the aperture extends through a plastic member which incorporates a hydrophilic substance.

19. A detector as in claim 18 wherein the plastic member is porous.

20. A detector as in claim 19 wherein the plastic member is removably carried by the housing.

21. A detector as in claim 16 which includes a focusing lens carried by the housing wherein the lens incorporates a surfactant.

22. A detector as in claim 15 wherein the housing is molded, at least in part, of a porous plastic which includes the hydrophilic substance.

23. A detector as in claim 15 which incorporates a condensation sensor.

24. A detector as in claim 23 which incorporates control circuitry carried by the housing wherein the control circuitry is coupled to the condensation sensor.

* * * * *